US 9,935,550 B2

(12) United States Patent
Zhu et al.

(10) Patent No.: US 9,935,550 B2
(45) Date of Patent: Apr. 3, 2018

(54) SYSTEM AND METHOD FOR PREVENTING CROSS-CONDUCTION WHEN SWITCHING CIRCUITRY DURING VOLTAGE REGULATION

(71) Applicant: DELL PRODUCTS, LP, Round Rock, TX (US)

(72) Inventors: Guangyong Zhu, Austin, TX (US); Shiguo Luo, Austin, TX (US); Kejiu Zhang, Round Rock, TX (US); Lei Wang, Austin, TX (US)

(73) Assignee: DELL PRODUCTS, LP, Round Rock, TX (US)

( * ) Notice: Subject to any disclaimer, the term of this patent is extended or adjusted under 35 U.S.C. 154(b) by 0 days.

(21) Appl. No.: 15/247,290

(22) Filed: Aug. 25, 2016

(65) Prior Publication Data

US 2018/0062512 A1     Mar. 1, 2018

(51) Int. Cl.
*H02M 3/158* (2006.01)
*H02M 1/38* (2007.01)

(52) U.S. Cl.
CPC ............. *H02M 3/158* (2013.01); *H02M 1/38* (2013.01)

(58) Field of Classification Search
CPC ...... H02M 3/155–3/158; H02M 3/335; H02M 1/24; H02M 1/38; H02H 7/122; H02H 7/125; H02H 7/5387; G05F 1/10; G05F 1/40; H05B 37/02
USPC ................. 323/237, 265, 271–275, 280–285
See application file for complete search history.

(56) References Cited

U.S. PATENT DOCUMENTS

| | | |
|---|---|---|
| 5,481,212 A | 1/1996 | Shima |
| 6,940,262 B2 | 9/2005 | Dequina et al. |
| 7,187,226 B2 | 3/2007 | Audy |
| 7,508,178 B2 | 5/2009 | McDonald et al. |
| 8,219,832 B2 | 7/2012 | Breen, III et al. |
| 8,816,655 B2 | 8/2014 | Zhu |
| 8,890,493 B2 * | 11/2014 | Isik .................. H02M 3/07 307/66 |
| 2005/0184716 A1 * | 8/2005 | Brown .............. H02M 1/38 323/283 |
| 2008/0088284 A1 * | 4/2008 | Weng .............. H02M 3/1563 323/271 |
| 2010/0002472 A1 * | 1/2010 | Brohlin ............. H02M 3/158 363/21.1 |
| 2014/0191736 A1 * | 7/2014 | Babazadeh ....... H02M 3/1582 323/271 |
| 2015/0113294 A1 | 4/2015 | Zhang et al. |

OTHER PUBLICATIONS

"ISL 6322 Four-Phase Buck PWM Controller with Integrated MOSFET Drivers and I2C Interface for Intel VR10, VR11, and AMD Applications," Intersil Data Sheet FN6328.2, Aug. 2, 2007; pp. 1-41.

(Continued)

*Primary Examiner* — Yemane Mehari
(74) *Attorney, Agent, or Firm* — Larson Newman, LLP

(57) ABSTRACT

To prevent cross-conduction when switching switches in switching circuitry for voltage regulation, a dead time may be maintained between turning off a switch and turning on a switch. The dead time may be determined based on a switching transition voltage and a voltage of the switching circuitry and may be implemented using a timer.

17 Claims, 10 Drawing Sheets

(56) References Cited

OTHER PUBLICATIONS

"MIC46105 Evaluation Board, 85V Half-Bridge MOSFET Drivers with Adaptive Dead Time and Shoot-Through Protection," Micrel Inc., Rev. 1.0, Nov. 18, 2013; pp. 1-7.
"NCP1581/D: High Frequency Synchronous Step Down PWM Controller for Tracking Applications," on Semiconductor Product Data Sheet; Jan. 2010; pp. 1-14.
"TPS2836, TPS2837 Synchronous-Buck MOSFET Driver with Dead-Time Control," Texas Instruments Production Data, SLVS224B, Rev. Aug. 2002, pp. 1-17.

\* cited by examiner

SYSTEM AND METHOD FOR PREVENTING CROSS-CONDUCTION WHEN SWITCHING CIRCUITRY DURING VOLTAGE REGULATION

FIELD OF THE DISCLOSURE

The present disclosure generally relates to voltage regulators, and more particularly relates to preventing cross-conduction when switching circuitry during voltage regulation.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

Information handling systems such as servers, desktop computers, laptop computers, and other computing devices may include voltage regulators for providing voltage regulation to one or more elements or components of the information handling system. Voltage regulators may include switching circuitry and regulate a voltage output via switching switches of the switching circuitry. Switching circuitry may include two switching transistors coupled in series that are switched to regulate output voltage of the voltage regulator.

SUMMARY

To prevent cross-conduction when switching switches in switching circuitry for voltage regulation, a dead time may be maintained between turning off a switch and turning on a switch. The dead time may be determined based on both a voltage associated with switching and a voltage of the switching circuitry.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

Figure 1A:
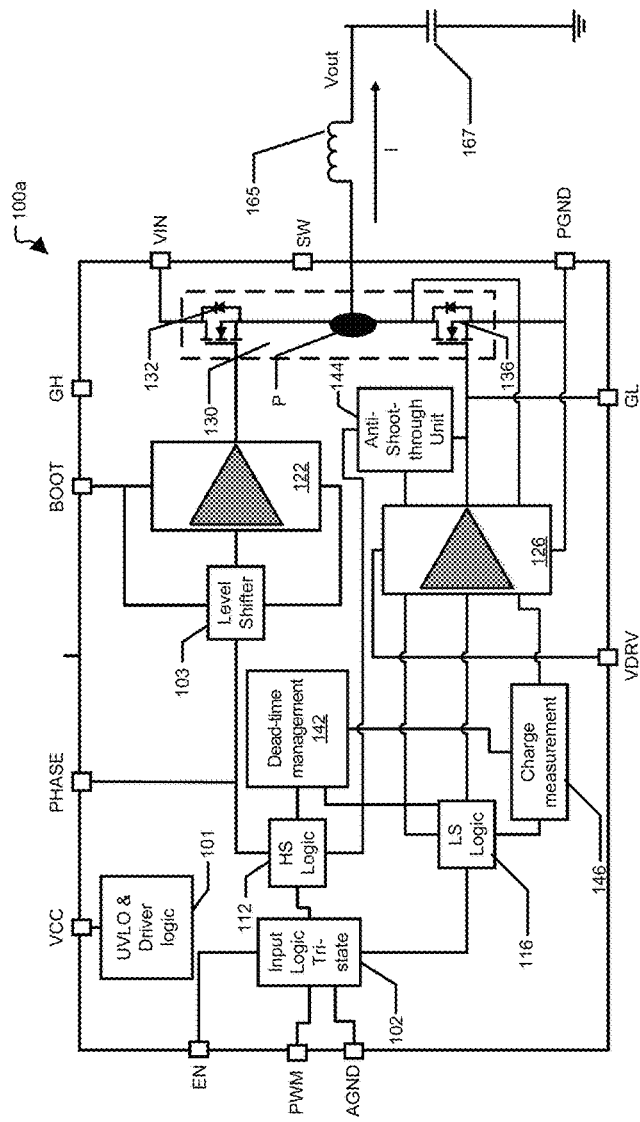
FIG. 1a is a schematic view of an integrated semiconductor implementing a voltage regulator including switching circuitry, according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Voltage regulator devices may include switching circuitry and regulate a voltage output via switching switches of the switching circuitry. Switching circuitry may include two switching transistors coupled in series that are switched to regulate output voltage of the voltage regulator. The switching transistors of the switching circuitry are switched on and off in a synchronization to regulate voltage output.

More particularly, the two switching transistors are controlled to be transitioned between on and off states in a synchronization in which one transistor of the two transistors is in an off state while the other transistor of two transistors is in an on state; that is, the two transistors are controlled to be alternatively on and off relative to each other. Thus, the synchronization may include asynchronous switching of the switching transistors such that one transistor is adequately off before the other transistor is on to prevent cross-conduction across the two transistors. Thus, switching transistors in switching circuitry may be switched according to an asynchronous synchronization. It is desirable to ensure one transistor is adequately off before the other transistor is on to prevent cross-conduction across the two transistors in which both switching transistors are at least partially on and conducting across the source-drain channel simultaneously. Cross-conduction can lead to switching circuitry and voltage regulator failure because cross-conduction across the transistors may cause the transistors to short power to ground through the source-drain channels of the transistors.

Thus it is desirable to control switching of the switches of the switching circuitry to ensure that one transistor is adequately off and the drain-source channel closed or highly resistive before the other transistor is turned on to prevent cross-conduction. To this end of preventing cross-conduction, both a voltage associated with switching is monitored as is a voltage output (for example, the phase node voltage) of the switching circuitry. Once the voltage output reaches a threshold, then the other transistor may be turned on after a time period based on the threshold and reaching the same.

More particularly, the voltage associated with switching may include a switching control signal, for example, a pulse width modulation signal (PWM), a gate voltage of a gate of one of the switching transistors, for example the gate voltage of the switching transistor in the on state transitioning to the off state, or a voltage output of the switching circuitry, for example, the phase node voltage. This voltage associated with switching may generally be referred to as a switching transition voltage. This switching transition voltage serves to indicate that the on switching transistor is transitioning to off.

Voltage regulators or portions thereof may be implemented in semiconductor devices. FIG. 1a shows an integrated semiconductor 100a implementing a voltage regulator including switching circuitry 130 having a pair of transistors. Integrated semiconductor 100 includes under-voltage lockout (UVLO) circuitry 101, input logic circuitry 102, and level shifter module 103. Level shifter module 103 is operable to shift a voltage level up or down.

Figure 1B:
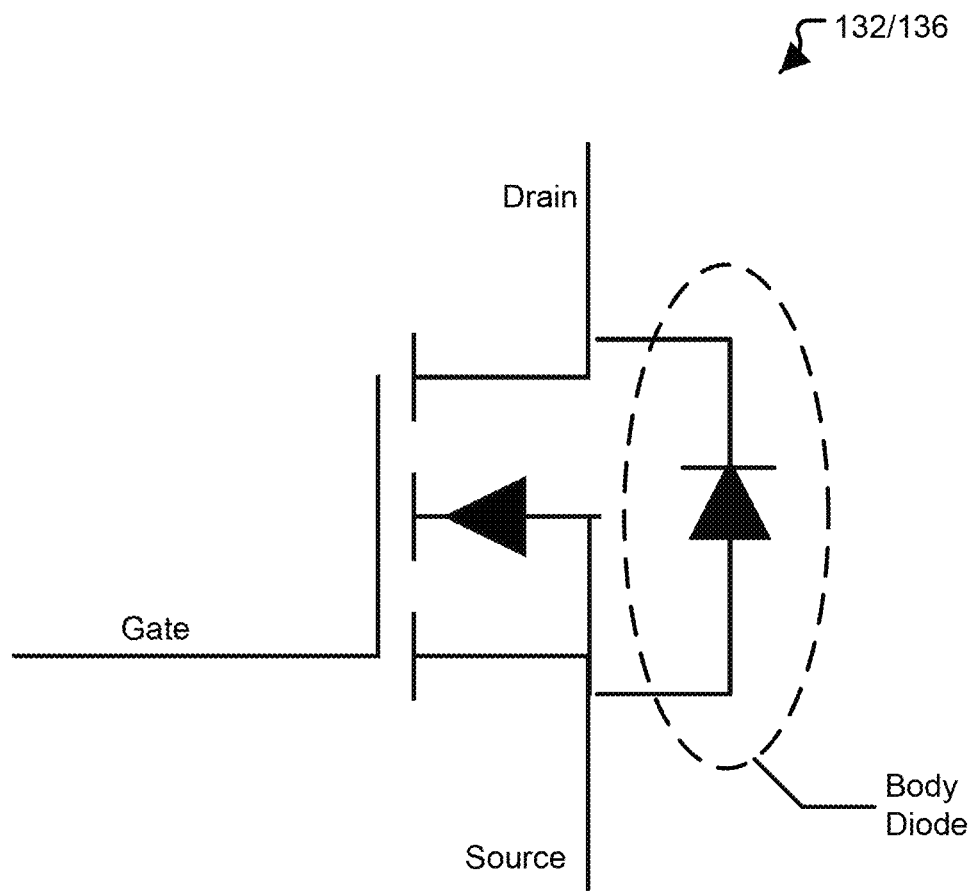
FIG. 1b is a schematic view of a switching transistor, according to an embodiment of the present disclosure.

Integrated semiconductor 100 also includes logic 112, logic 116, driver 122, driver 126, switching transistor 132, and switching transistor 136. Integrated semiconductor 100 also includes dead-time logic 142, anti-shoot through logic 144, and charge measurement logic 146. Switching transistors 132 and 136 may be MOSFET devices. Referring to FIG. 1b, FIG. 1b illustrates an embodiment 132/136 of switching transistors 132 and 136. Switching transistor embodiment 132/136 includes a gate which is operable to switch transistor embodiment 132/136 on or off by opening or closing, respectively, a channel between source and drain based on applied gate voltage. As shown, transistor embodiment 132/136 forms a body diode across source and drain in operation, and this body diode has a corresponding body diode voltage.

Referring back to FIG. 1a, logic 112 may be considered high side or high voltage logic and controls driver 122 which may be considered the high side or high voltage driver. Driver 122 is connected to the gate of switching transistor 132 and drives switching transistor 132 to regulate voltage. Switching transistor 132 may be considered the high side or high voltage switching transistor. Logic 112, driver 122, and switching transistor 132 may regulate a supply voltage provided to semiconductor 100 and as such are considered high side or high voltage logic because these elements regulate the 'high' or supply voltage of semiconductor 100.

Logic 116 may be considered low side or low voltage logic and controls driver 126 which may be considered the low side or low voltage driver. Driver 126 is connected to the gate of switching transistor 136 and drives switching transistor 136 to regulate voltage. Switching transistor 136 may be considered the low side or low voltage switching transistor. Logic 116, driver 126, and switching transistor 136 may regulate switching relative to the ground (or low voltage) plane in semiconductor 100 and as such are considered low side or low voltage logic because these elements regulate switching with regard to the ground or low voltage plane of semiconductor 100.

As can be seen from FIG. 1a, switching transistor 132 is connected to switching transistor 136 in series. The point of coupling between switching transistors 132 and 136 may be considered to be the voltage output or phase node of the voltage regulator and is shown as P. Node P may be coupled to a load via an inductance to supply power to the load. More particularly, as shown in FIG. 1a, node P is coupled to inductor 165 and capacitance 167 to provide a voltage output (Vout) to a load (not shown). A current I traverses inductor 165.

As can further be seen from FIG. 1a, when the source-drain channel of switching transistor 132 is formed due to control of the gate of transistor 132 by driver 122, the source-drain channel electrically connects the supply voltage (illustrated as VIN) with phase node P. Similarly, when the source-drain channel of switching transistor 136 is formed due to control of the gate of transistor 136 by driver 126, the source-drain channel electrically connects phase node P with the ground plane (illustrated as PGND).

As can be seen from the transistor layout and series connection of transistors 132 and 136, if the formation of the source-drain channels of transistors 132 and 136 overlap in time, then there will be a connection or cross-conduction from power to ground, that is, there will be a voltage shoot-through through transistors 132 and 136 across switching circuitry 130, damaging switching circuitry 130 of the voltage regulator. Therefore, drivers 122 and 126 drive transistors 132 and 136, respectively, as controlled by logics 112 and 116, in an alternating sequence to prevent cross-conduction. For example, according to an asynchronous synchronization. To prevent cross-conduction, logics 112 and 116 control drivers 122 and 126 to drive transistors 132 and 136 in an alternating sequence such that there is an interregnum or dead time between when transistors 132 and 136 are on and a source-drain channel is formed, thereby avoiding cross-conduction across transistors 132 and 136.

To determine the dead time between switching transistors, a switching transition voltage is monitored by logic to detect when the switching transistor in the on state transitions to the off state. The phase node voltage (at node P) is also monitored by logic and used to determine a dead time between turning off a transistor and turning on the other transistor of transistors 132 and 136.

More particularly, to determine if a transistor channel of a transistor is adequately closed, such that the other transistor of the switching circuitry may be turned on, and a channel formed between source and drain while avoiding cross-conduction, the switching transition voltage is compared with a voltage threshold, once the voltage threshold is reached for the switching transition voltage, then the phase node voltage (at node P) is measured and compared with the body diode voltage of the turning-off transistor; when the phase node voltage (at P) crosses a threshold based on the body diode voltage, then a delay may be set, when the delay has expired, indicating the source-drain channel of the turning off transistor is adequately closed to prevent cross-conduction, then the other transistor is turned on (by application of a gate voltage) and applies a voltage to the phase node (at P).

As can be seen from FIG. 1, charge measurement logic 146 is coupled to node P to monitor the phase voltage. Charge measurement logic 146 passes an indication of the monitored value of the phase node voltage to dead-time logic 142 and anti-shoot through logic 144. Drivers 122 and 126 detect the gate voltages at respective transistors 132 and 136. Drivers 122 and 126 pass an indication of the detected gate voltages of respective transistors 132 and 136 to dead-time logic 142 and anti-shoot through logic 144 which are coupled to logics 112 and 116, as can be seen from the schematic layout of FIG. 1. Furthermore, a switching control signal such as a PWM may be received at integrated semiconductor 100 and provided to logics 112 and 116 via input logic 102. In turn, logics 112 and 116 may provide the switching control signal to dead-time logic 142 and anti-shoot through logic 144. Thus, dead-time logic 142 and anti-shoot through logic 144 have access to switching transition voltages which may include a switching control signal, a gate voltage of a gate of the switching transistor in the on state transitioning to the off state, or the phase node voltage.

Dead-time logic 142 and anti-shoot through logic 144 are configured to compare the received switching transition voltage with a threshold and also to compare the indication of the value of the phase node voltage with a threshold and to interface with logics 112 and 116 to control transistors 132 and 136 to be alternatively on and off relative to each other in a switching sequence incorporating the dead time.

Figure 2A:
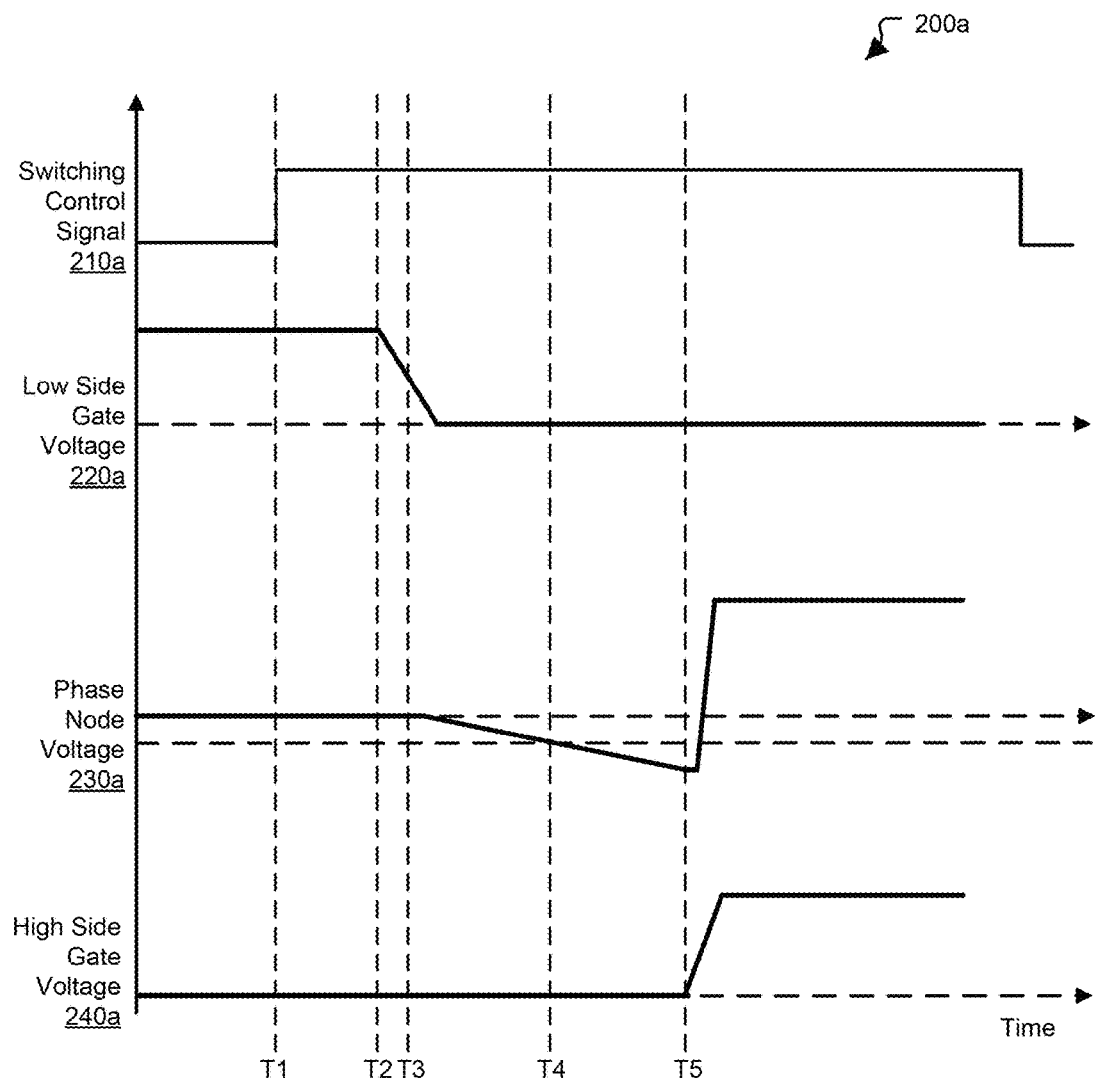
FIG. 2a is a timing diagram illustrating a dead time between switching transistors, according to an embodiment of the present disclosure.
Figure 2B:
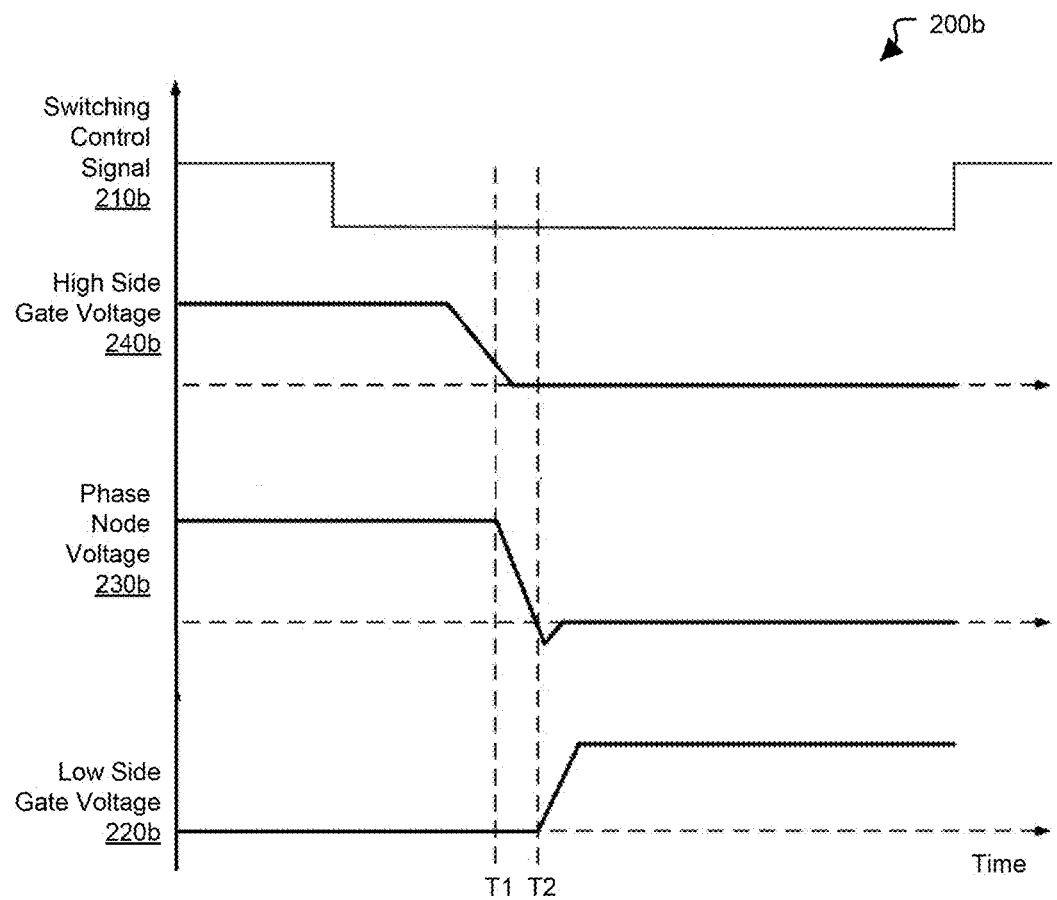
FIG. 2b is a timing diagram illustrating a dead time between switching transistors, according to an embodiment of the present disclosure.

FIGS. 2a and 2b show timing diagrams 200a and 200b, respectively, illustrating switching switching circuitry, for example in a device such as integrated semiconductor 100a. Timing diagrams 200a and 200b illustrate timing in the event that the inductor current I through inductor 165 of FIG. 1a is greater than zero. Timing diagram 200a illustrates determining a dead time based on both a switching transition voltage and a phase node voltage.

Timing diagram 200a illustrates a dead time between turning off a low side transistor such as transistor 136 of FIG. 1a and turning on a high side transistor such as transistor 132 of FIG. 1a. Timing diagram 200a illustrates a switching control signal 210a provided to switching circuitry, a low side gate voltage 220a provided to the gate of the low side transistor, for example transistor 136, a phase node voltage 230a of the switching circuitry, for example the voltage at node P of FIG. 1a, and a high side gate voltage 240a provided to the gate of the high side transistor, for example transistor 132. At T1, switching control signal 210a provides a switching control signal to a voltage regulator. Switching control signal 210a may be a pulse width modulation signal (PWM). As can be seen from timing diagram 200a, initially, the low side transistor is in an on state, as illustrated by low side gate voltage 220a, and the high side transistor is in an off state, as illustrated by high side gate voltage 240a. At T2, the low side transistor begins to be turned off, and low side gate voltage 220a begins to fall. At T3, low side gate voltage 220a falls below a threshold, for example 1 Volt. Also, the phase node voltage starts to falls below a 0 Volt threshold. Once low side gate voltage 220a falls below the threshold at T3, subsequent to T1, T2, or T3, phase node voltage 230a is monitored. At a subsequent time T4, phase node voltage 230a falls below a threshold, for example, a half of the body diode voltage of the low side transistor, for example, 0.4 Volts. The time period between one of T1, T2, or T3 and T4 is measured (for example, through a counter), and this time period is increased (for example doubled) and serves as the dead time for turning on the high side transistor. In the particular example of diagram 200a, the time period between T3 and T4 is used. At T5, high side gate voltage 240a is applied to the gate of the high side transistor, turning on the high side transistor. Thus, the dead time from when the low side transistor begins to be turned off to the time when the high side transistor begins to be turned on is the time period between T3 and T5 or twice the time period between T3 and T4.

In situations where inductor current I through inductor 165 of FIG. 1a is small and the body diode voltage fails to reach a threshold or where the transition takes too long, it is possible to set a default dead time, for example a default dead time of 20 ns. It may be desirable to report a warning signal upon determining the body diode voltage fails to reach a voltage threshold or where the transition takes too long.

Timing diagram 200b illustrates a dead time between turning off a high side transistor such as transistor 132 of FIG. 1a and turning on a low side transistor such as transistor 136 of FIG. 1a. Timing diagram 200b illustrates a switching control signal 210b provided to switching circuitry, a low side gate voltage 220b provided to the gate of the low side transistor, for example transistor 136, a phase node voltage 230b of the switching circuitry, for example the voltage at node P of FIG. 1a, and a high side gate voltage 240b provided to the gate of the high side transistor, for example transistor 132. Switching control signal 210b provides a switching control signal to a voltage regulator. Switching control signal 210b may be a pulse width modulation signal (PWM). As can be seen from timing diagram 200b, initially, the high side transistor is in an on state, as illustrated by high side gate voltage 240b, and the low side transistor is in an off state, as illustrated by low side gate voltage 220b. In timing diagram 200b, either high side gate voltage 240b dropping below a voltage threshold (at T1) or the phase node voltage falling to zero (at T2) may be used to determine when to turn on the low side transistor.

Figure 3A:
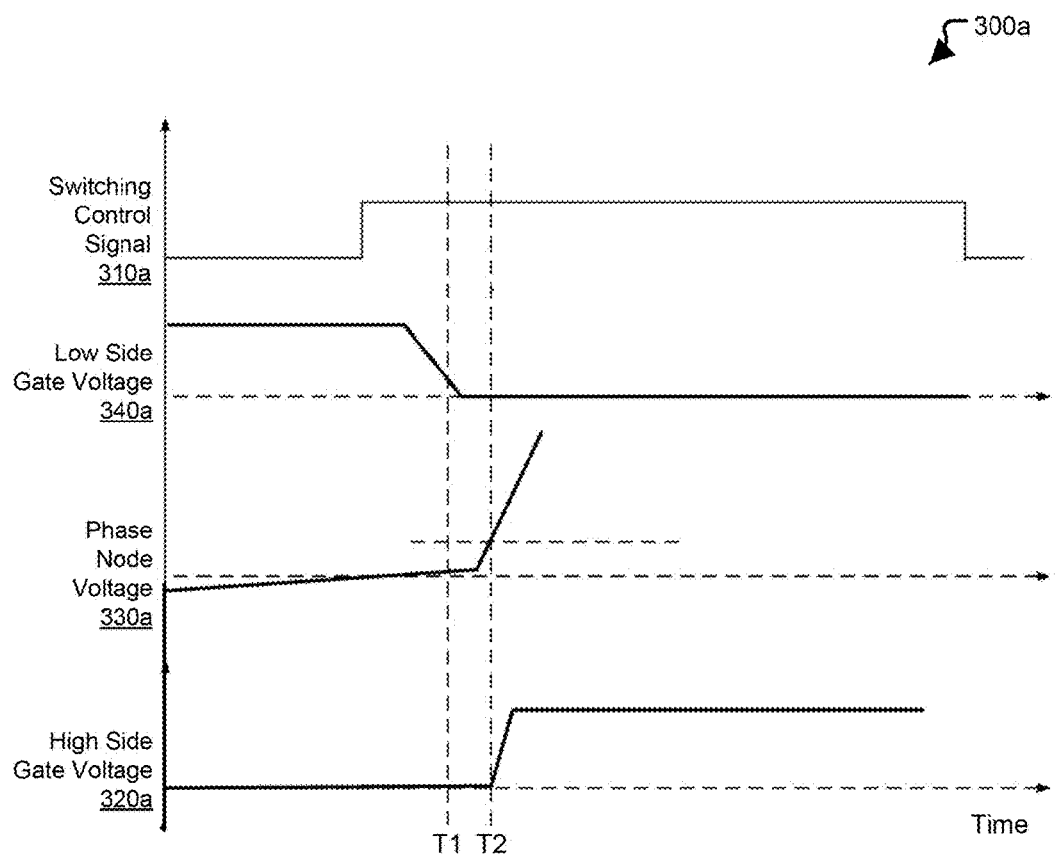
FIG. 3a is a timing diagram illustrating a dead time between switching transistors, according to an embodiment of the present disclosure.
Figure 3B:
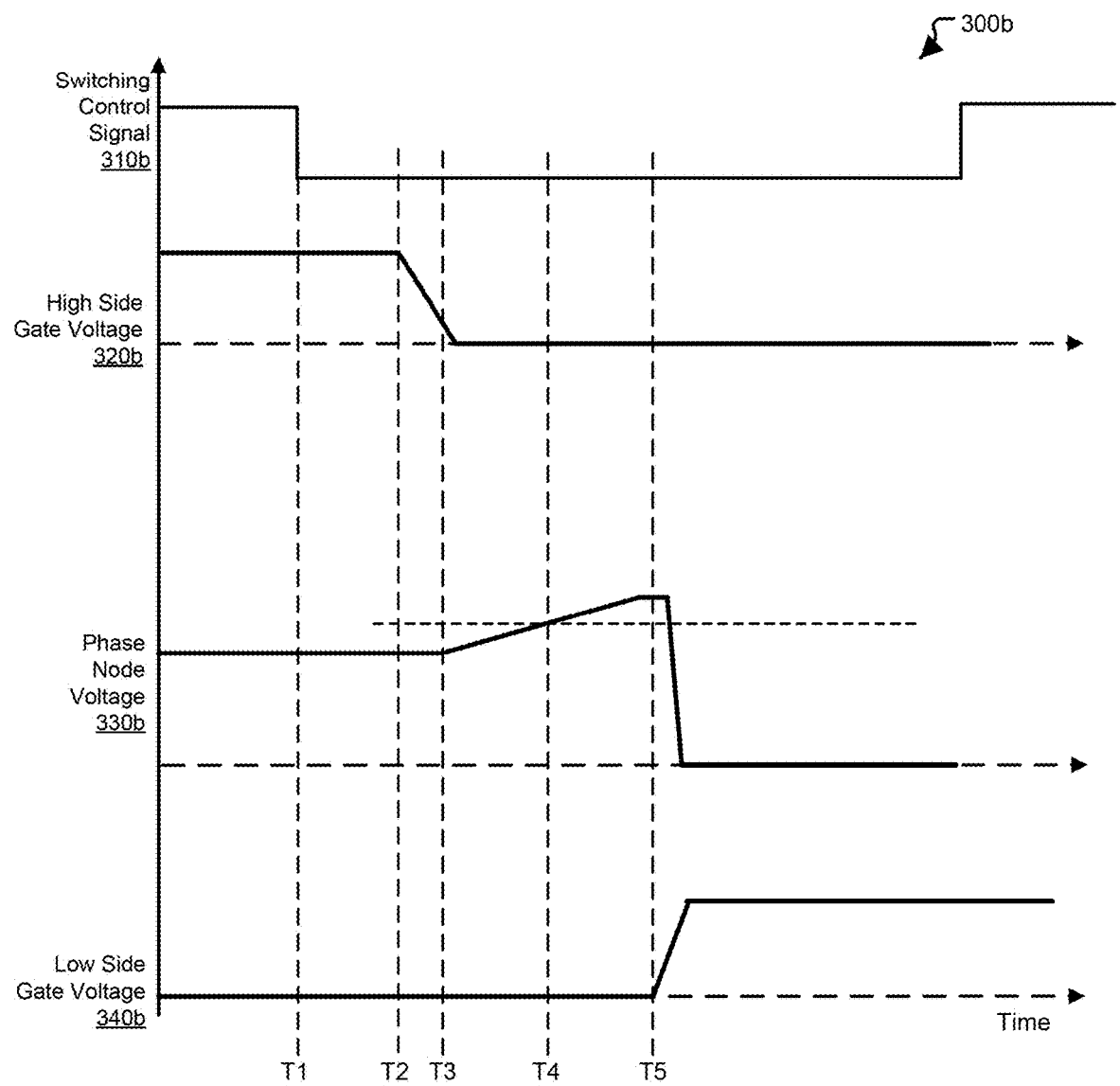
FIG. 3b is a timing diagram illustrating a dead time between switching transistors, according to an embodiment of the present disclosure.

FIGS. 3a and 3b show timing diagrams 300a and 300b, respectively, illustrating switching switching circuitry, for example in a device such as integrated semiconductor 100a. Timing diagrams 300a and 300b illustrate timing in the event that the inductor current I through inductor 165 of FIG. 1a is less than zero. Timing diagram 300b illustrates determining a dead time based on both a switching transition voltage and a phase node voltage.

Timing diagram 300a illustrates a dead time between turning off a low side transistor such as transistor 136 of FIG. 1a and turning on a high side transistor such as transistor 132 of FIG. 1a. Timing diagram 300a illustrates a switching control signal 310a provided to switching circuitry, a low side gate voltage 340a provided to the gate of the low side transistor, for example transistor 136, a phase node voltage 330a of the switching circuitry, for example the voltage at node P of FIG. 1a, and a high side gate voltage 320a provided to the gate of the high side transistor, for example transistor 132. Switching control signal 310a provides a switching control signal to a voltage regulator. Switching control signal 310a may be a pulse width modulation signal (PWM). As can be seen from timing diagram 300a, initially, the low side transistor is in an on state, as illustrated by low side gate voltage 340a, and the high side transistor is in an off state, as illustrated by high side gate voltage 320a. In timing diagram 300a, either low side gate voltage 340a dropping below a voltage threshold (at T1) or phase node voltage 330a exceeding a voltage threshold (at T2) may be used to determine when to turn on the high side transistor.

As stated above, timing diagram 300b illustrates determining a dead time based on both a switching transition voltage and a phase node voltage. Timing diagram 300b will be discussed hereinafter with regard to the specific example of switching transition voltage being high side gate voltage 320b.

FIG. 3b shows a timing diagram 300b illustrating a dead time between turning off a high side transistor such as transistor 132 of FIG. 1a and turning on a low side transistor such as transistor 136 of FIG. 1a. Timing diagram 300b illustrates switching control signal 310b provided to switching circuitry, a high side gate voltage 320b provided to the gate of the high side transistor, for example transistor 132, a phase node voltage 330b of the switching circuitry, for example the voltage at node P of FIG. 1a, and a low side gate voltage 340b provided to the gate of the low side transistor, for example transistor 136. At T1, control signal 310b provides a switching control signal to a voltage regulator. As can be seen from timing diagram 300b, initially, the high side transistor is in an on state, as illustrated by high side gate voltage 320b being high, and the low side transistor is in an off state. At T2, the high side transistor begins to be turned off, and high side gate voltage 320b begins to fall. At T3, high side gate voltage 320b falls below a threshold, for example 1 Volt. Once high side gate voltage 320b falls below the threshold at T3, then phase node voltage 330b is monitored. At a subsequent time T4, phase node voltage 330b rises above (passes) a threshold higher than the supply voltage, for example, a half of the voltage drop of the high side body diode, for example, 0.4 volts. The time period between T3 and T4 is measured (for example, through a counter), and this time period is doubled and serves as the dead time for turning on the low side transistor. At T5, low side gate voltage 340 is turned on, turning on the low side transistor. Thus, the dead time from when the high side transistor begins to be turned off to the time when the low side transistor begins to be turned on is the time period between T3 and T5 or twice the time period between T3 and T4.

Figure 4A:
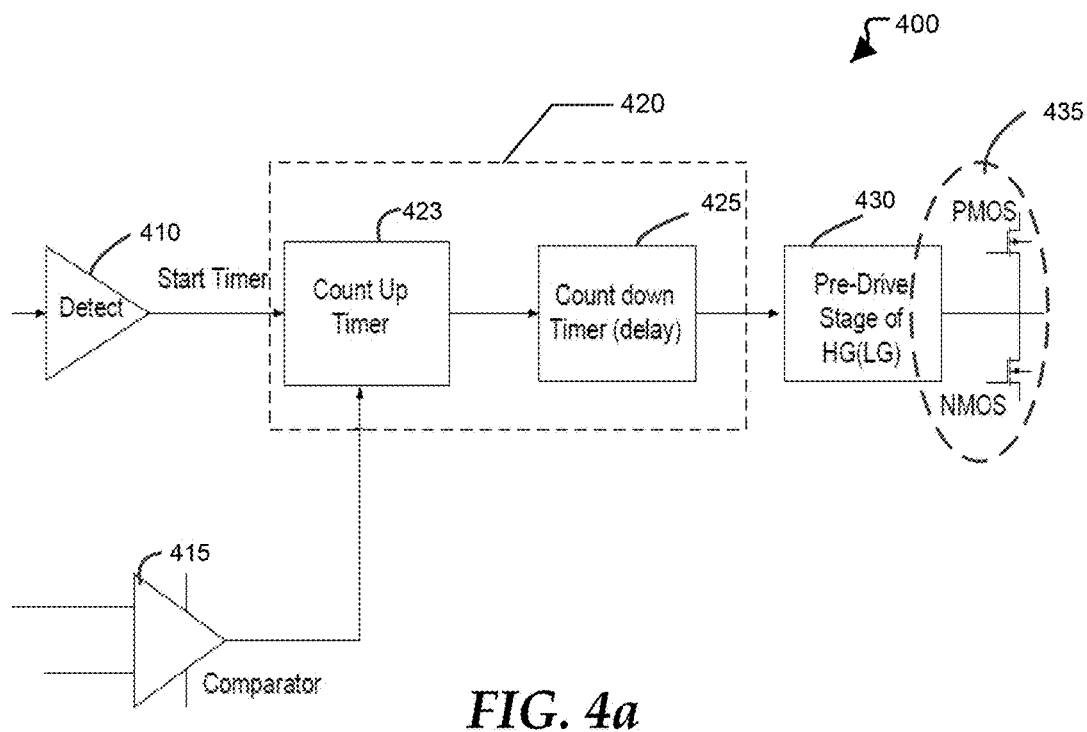
FIG. 4a is a schematic view of logic for determining a dead time, according to an embodiment of the present disclosure.

FIG. 4a shows logic 400 for determining dead time for switching during voltage regulation as disclosed herein. Logic 400 may be implemented, for example, in dead-time logic 142, anti-shoot through logic 144, and charge measurement logic 146 of device 100 of FIG. 1. Logic 400 includes detect logic 410, comparator logic 415, counter logic 420 including increment logic 423 and decrement logic 425, pre-driver logic 430, and driver logic 435. As shown, driver logic 435 may include a matched pair of PMOS and NMOS transistors.

When determining the dead time between turning off the low side transistor and turning on the high side transistor in switching circuitry of a voltage regulator, such as illustrated in FIG. 2a, detect logic 410 may detect a switching control signal indicating switching, and further detects a switching transition voltage traversing a threshold, for example, when the low side gate voltage supplied to the gate of the low side transistor falls below a threshold, for example, 1 Volt. When the switching transition voltage traverses the threshold, then increment logic 423 of counter logic 420 may begin to increment a dead time counter. When comparator logic 415 determines that the phase node voltage has passed a threshold, for example, half the voltage drop of the low side transistor body diode, then decrement logic 425 of counter logic 420 may begin to decrement the dead time counter. Once the dead time counter has been decremented, thereby implementing a dead time from when the low side transistor begins to be turned off, pre-driver logic 430, and driver logic 435 may apply a voltage to the gate of the high side transistor, thereby turning on the high side transistor a dead time after beginning to turn off the low side transistor, preventing cross-conduction.

When determining the dead time between turning off the high side transistor and turning on the low side transistor in switching circuitry of a voltage regulator, such as illustrated in FIG. 3b, detect logic 410 may detect a switching control signal indicating switching, and further detects when the high side gate voltage supplied to the gate of the high side transistor falls below a threshold, for example, 1 Volt. When the high side gate voltage supplied to the gate of the high side transistor falls below the threshold, then increment logic 423 of counter logic 420 may begin to increment a dead time counter. When comparator logic 415 determines that the phase node voltage has passed a threshold, for example, half the voltage drop of the high side transistor body diode, then decrement logic 425 of counter logic 420 may begin to decrement the dead time counter. Once the dead time counter has been decremented, thereby implementing a dead time from when the high side transistor begins to be turned off, pre-driver logic 430, and driver logic 435 may apply a voltage to the gate of the low side transistor, thereby turning on the low side transistor a dead time after beginning to turn off the high side transistor, preventing cross-conduction.

Figure 4B:
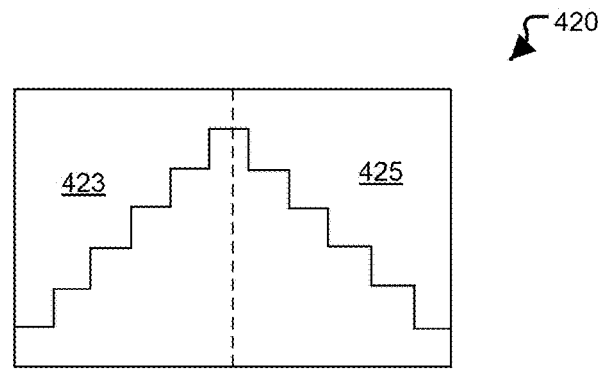
FIG. 4b is a graphical representation of counter logic, according to an embodiment of the present disclosure.

FIG. 4b shows a graphical representation of counter logic 420, shown in FIG. 4a. Counter logic 420 increments a counter via increment logic 423 and decrements the counter via decrement logic 425, as shown.

Figure 5:
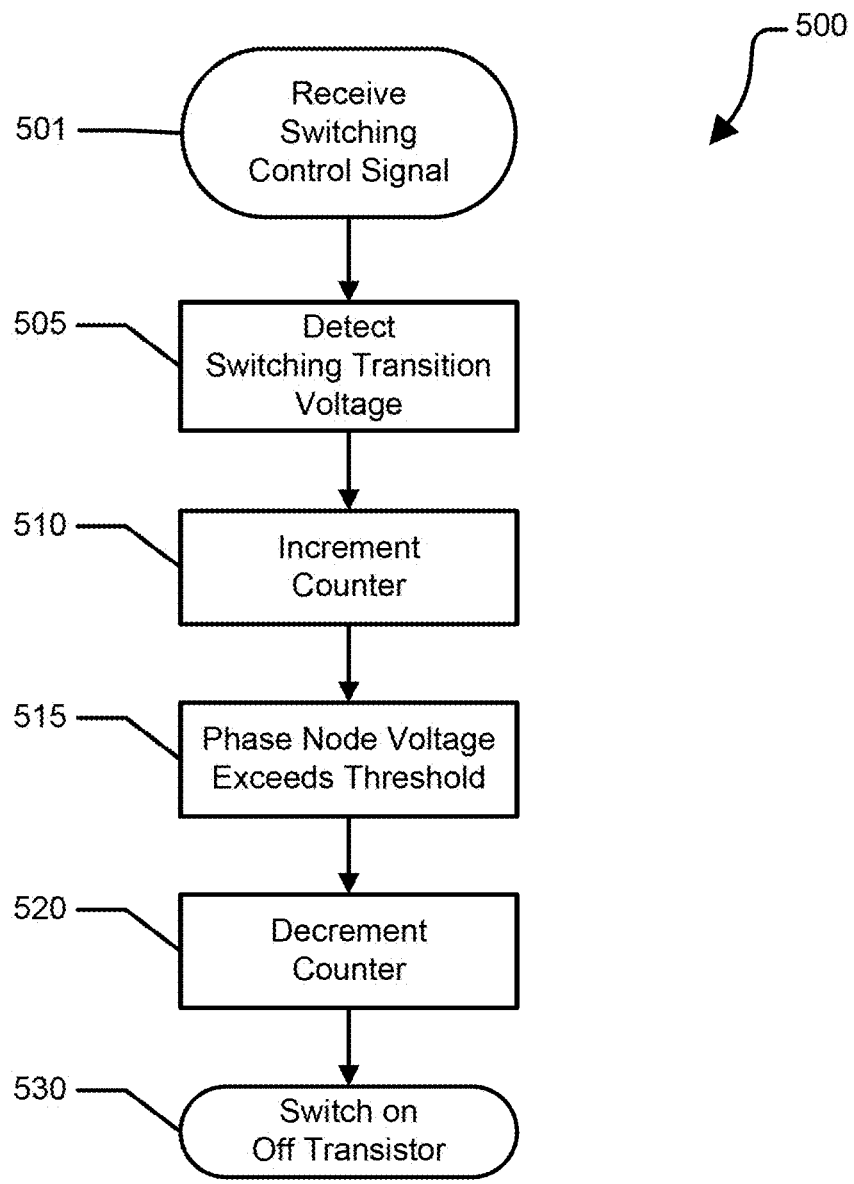
FIG. 5 is a flow chart for determining a dead time for switching, according to an embodiment of the present disclosure.

FIG. 5 shows a method 500 to determine a dead time as disclosed with regard to logic 400. At 501, a switching control signal is received, and in response, the on transistor in switching circuitry is to be turned off and the off transistor is to be turned on after a determined dead time. At 505 the switching transition voltage is detected. When the switching transition voltage passes a threshold, at 510, then a dead time counter is incremented until the phase voltage exceeds a threshold, for example half the body diode voltage drop of the on transistor, at 515, then the dead time counter is decremented, at 520. When the dead time counter is fully decremented, implementing a dead time, then, at 530, the off transistor is switched on. As would be understood by one of skill in the art, incrementing and then subsequently decrementing a dead time counter as discussed with regard to FIGS. 4 and 5, results in a dead time duration that may be twice the time period defined from the switching transition voltage passing a threshold to the time the phase voltage passes a threshold which may be defined as half the body diode voltage drop of the on transistor, for example.

Figure 6:
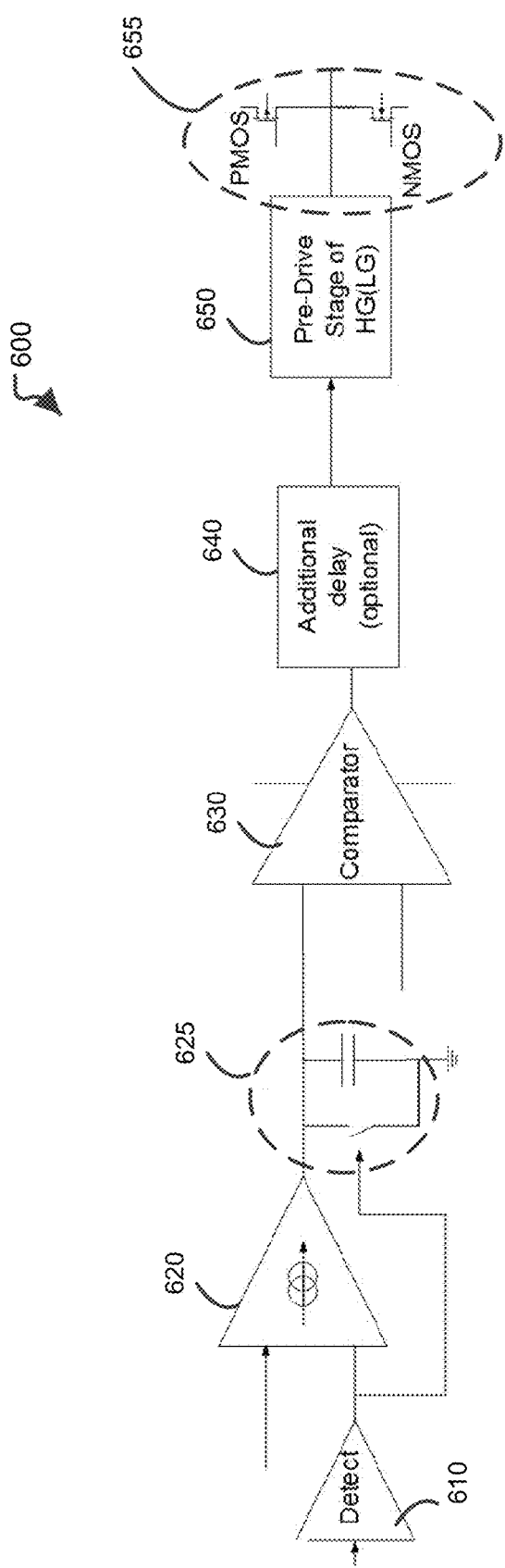
FIG. 6 is a schematic view of logic for determining a dead time, according to an embodiment of the present disclosure.

FIG. 6 shows logic 600 for determining dead time for switching during voltage regulation as disclosed here. Logic 600 may be implemented, for example, in dead-time logic 142, anti-shoot through logic 144, and charge measurement logic 146 of device 100 of FIG. 1. Logic 600 includes detect logic 610, voltage logic 620, integration logic 625, comparator logic 630, delay logic 640, pre-driver logic 650, and driver logic 655.

When determining the dead time between turning off the low side transistor and turning on the high side transistor in switching circuitry of a voltage regulator, such as illustrated in FIG. 2a, detect logic 610 may detect a control signal indicating switching, and further detects when the low side gate voltage supplied to the gate of the low side transistor falls below a threshold, for example, 1 Volt. Subsequently, voltage logic 620 detects when the phase voltage crosses zero or begins to fall. Integration logic 625 integrates the values defined by the phase voltage over time. Comparator logic 630 compares the integration value integrated by integration logic 625 with an integration value threshold. This comparison of the integration value with the integration value threshold provides a delay which may be used to determine a dead time. Additional delay may be added with delay logic 640. Subsequent to the dead time from when the low side transistor begins to be turned off, pre-driver logic 430, and driver logic 435 may apply a voltage to the gate of the high side transistor, thereby turning on the high side transistor a dead time after beginning to turn off the low side transistor, preventing cross-conduction.

When determining the dead time between turning off the high side transistor and turning on the low side transistor in switching circuitry of a voltage regulator, such as illustrated in FIG. 3b, detect logic 610 may detect a switching control signal indicating switching, and further detects when the high side gate voltage supplied to the gate of the high side transistor falls below a threshold, for example, 1 Volt. Subsequently, voltage logic 620 detects when the phase voltage exceeds a value or begins to rise. Integration logic 625 integrates the values defined by the phase voltage over time. Comparator logic 630 compares the integration value integrated by integration logic with an integration value threshold. This comparison of the integration value with the integration value threshold provides a delay which may be used to determine a dead time. Additional delay may be added with delay logic 640. Subsequent to the dead time from when the high side transistor begins to be turned off, pre-driver logic 650, and driver logic 655 may apply a voltage to the gate of the low side transistor, thereby turning on the low side transistor a dead time after beginning to turn off the high side transistor, preventing cross-conduction.

Figure 7:
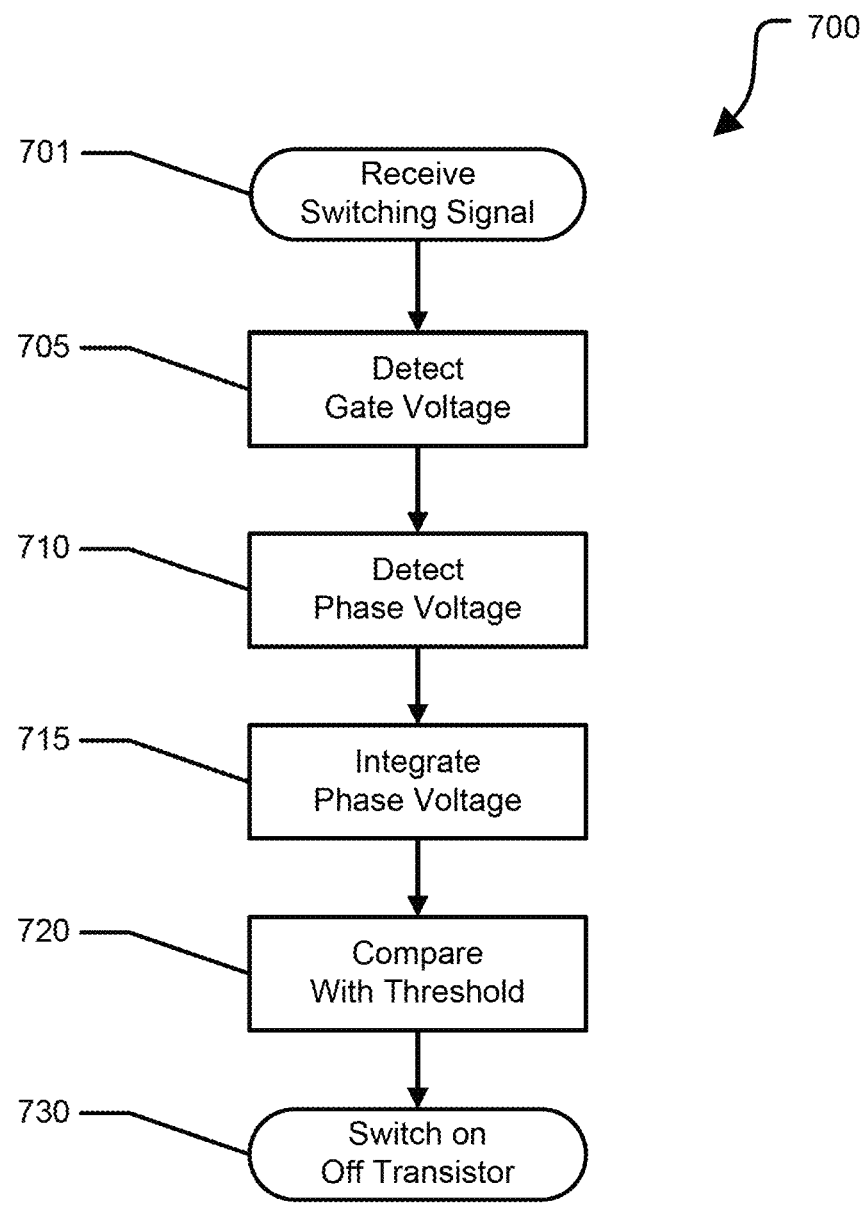
FIG. 7 is a flow chart for determining a dead time for switching, according to an embodiment of the present disclosure.

FIG. 7 shows a method 700 for determining a dead time as disclosed with regard to logic 600. At 701, a switching signal is received, and the on transistor in switching circuitry is to be turned off and the off transistor is to be turned on after a determined dead time. At 705 the gate voltage at the gate of the on transistor is detected. When the gate voltage passes a threshold, at 710, then the phase voltage is monitored, and when the phase voltage exceeds a value or the value begins to change, then the monitored phase node voltage values are integrated, at 715. The integrated phase node voltage is compared with a threshold value, at 720, and the time for the integrated phase voltage to exceed the threshold value is used to determine the dead time. Then, at 730, the off transistor is switched on after the dead time.

Determining and maintaining dead time in switching circuitry during voltage regulation as disclosed herein may be individually performed by voltage regulators with regard to individual switching circuitry. Determining and maintaining the dead time may be performed dynamically in real-time for each iteration of switching. That is, voltage regulator circuitry may determine a dead time after a switch is turned off and before another switch is turned on for each iteration of switching in switching circuitry for voltage regulation. Thus, different switching circuitries of the same design may have different dead times due to manufacturing tolerances.

The term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory.

Additionally, the computer-readable medium can include a magneto-optical or optical medium, such as a disk or tapes or other storage device to store information received via carrier wave signals such as a signal communicated over a transmission medium.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A voltage regulator comprising:
   switching circuitry including a first switching transistor and a second switching transistor, the first switching transistor and the second switching transistor electrically connected in series, a point of electrical connection between the first switching transistor and the second switching transistor providing a phase node of the switching circuitry; and
   switching logic configured to:
      when the first switching transistor is in an on state and the second switching transistor is in an off state, monitor a switching transition voltage of the first switching transistor;
      when the switching transition voltage passes a switching transition voltage threshold for the switching transition voltage of the first switching transistor, monitor a phase node voltage of the phase node, wherein the phase node voltage corresponds to a body diode voltage of the first switching transistor; and when the phase node voltage passes a phase node voltage threshold for the phase node voltage, turn on the second switching transistor after a dead time determined based on a temporal duration between the switching transition voltage passing the switching transition voltage threshold and the phase node voltage passing the phase node voltage threshold.

2. The voltage regulator of claim 1, wherein the switching transition voltage is a gate voltage of the first switching transistor.

3. The voltage regulator of claim 1, wherein the first switching transistor is a high side transistor.

4. The voltage regulator of claim 1, wherein the first switching transistor is a low side transistor.

5. The voltage regulator of claim 1, wherein the switching logic is configured to receive a switching control signal and cause the first switching transistor and the second switching transistor to transition states based upon the switching control signal.

6. The voltage regulator of claim 1, further comprising a timer, wherein the timer is incremented over the temporal duration to determine the dead time.

7. The voltage regulator of claim 6, wherein the timer is decremented subsequent to the phase node voltage passing the phase node voltage threshold to determine the dead time.

8. The voltage regulator of claim 6, further comprising a comparator, wherein the comparator is configured to compare the phase node voltage with the phase voltage threshold to determine when the phase node voltage passes the phase node voltage threshold.

9. The voltage regulator of claim 1, wherein if the phase node voltage fails to pass the phase node voltage threshold, a default dead time is set.

10. A method of switching during voltage regulation, the method comprising:
  receiving a switching signal when a first switching transistor is in an on state and a second switching transistor is in an off state;
  determining when a first gate voltage of a first gate of the first switching transistor passes a gate voltage threshold for the first gate voltage;
  when the first gate voltage passes the gate voltage threshold, monitor a phase node voltage defined by switching the first switching transistor and the second switching transistor, wherein the phase node voltage corresponds to a body diode voltage of the first switching transistor; and
  when the phase node voltage passes a phase node voltage threshold for the phase node voltage, turn on the second switching transistor after a dead time determined based on a temporal duration between the first gate voltage passing the gate voltage threshold and the phase node voltage passing the phase node voltage threshold.

11. The method of claim 10, wherein the first switching transistor is a high side transistor.

12. The method of claim 10, wherein the first switching transistor is a low side transistor.

13. The method of claim 10, wherein the phase node voltage threshold is based on a body diode voltage of the first switching transistor.

14. A voltage regulator comprising:
  switching circuitry including a first switching transistor and a second switching transistor, the first switching transistor and the second switching transistor electrically connected in series, a point of electrical connection between the first switching transistor and the second switching transistor providing a phase node of the switching circuitry; and
  switching logic configured to:
    when the first switching transistor is in an on state and the second switching transistor is in an off state, monitor a first gate voltage of a first gate of the first switching transistor;
    when the first gate voltage passes a gate voltage threshold, monitor the phase node voltage and integrate values of the phase voltage over time to derive an integration sum; and
    when the integration sum exceeds an integration threshold, turn on the second switching transistor after a dead time determined based on a temporal duration between the first gate voltage passing the gate voltage threshold and the integration sum exceeding the integration threshold.

15. The voltage regulator of claim 14, further comprising an integrator, wherein the integrator is configured to integrate values of the phase node voltage over time to derive the integration sum.

16. The voltage regulator of claim 14, wherein the first switching transistor is a high side transistor.

17. The voltage regulator of claim 14, wherein the first switching transistor is a low side transistor.

* * * * *